US010400799B2

(12) United States Patent
Schaber

(10) Patent No.: US 10,400,799 B2
(45) Date of Patent: Sep. 3, 2019

(54) ACTUATING DRIVE FOR A CONTROL VALVE, IN PARTICULAR A STEAM TURBINE CONTROL VALVE, AND METHOD FOR OPERATING SAME

(71) Applicant: VOITH PATENT GMBH, Heidenheim (DE)

(72) Inventor: Hubert Schaber, Rutesheim (DE)

(73) Assignee: Voith Patent GmbH, Heidenheim (DE)

( * ) Notice: Subject to any disclaimer, the term of this patent is extended or adjusted under 35 U.S.C. 154(b) by 144 days.

(21) Appl. No.: 15/537,729

(22) PCT Filed: Oct. 28, 2015

(86) PCT No.: PCT/EP2015/074961
§ 371 (c)(1),
(2) Date: Jun. 19, 2017

(87) PCT Pub. No.: WO2016/096221
PCT Pub. Date: Jun. 23, 2016

(65) Prior Publication Data
US 2018/0274567 A1    Sep. 27, 2018

(30) Foreign Application Priority Data
Dec. 19, 2014 (DE) .................. 10 2014 226 666

(51) Int. Cl.
*F15B 11/04* (2006.01)
*F15B 20/00* (2006.01)
(Continued)

(52) U.S. Cl.
CPC ............ *F15B 20/007* (2013.01); *F01D 17/18* (2013.01); *F15B 11/0423* (2013.01);
(Continued)

(58) Field of Classification Search
CPC .......... F01D 17/18; F01D 17/26; F16K 31/12; F15B 20/007; F15B 13/021; F15B 13/027; F15B 13/0444; F15B 11/0423
See application file for complete search history.

(56) References Cited

U.S. PATENT DOCUMENTS 4,589,444 A    5/1986 Masek et al.
5,137,253 A    8/1992 Frey et al.
(Continued)

FOREIGN PATENT DOCUMENTS

CN    103597219 A    2/2014
DE    4030107 A1     3/1992
(Continued)

Primary Examiner — Abiy Teka
(74) Attorney, Agent, or Firm — Laurence A. Greenberg; Werner H. Stemer; Ralph E. Locher

(57) ABSTRACT

An actuating drive for a regulation valve has a working cylinder with a piston and a piston rod, which piston rod forms an actuator. The piston delimits a first pressure chamber of the working cylinder. The first pressure chamber has a first pressure port for the introduction of a pressurized working medium for displacing the piston, by exertion of pressure, counter to the force of a spring. An external working medium circuit is connected to the working cylinder for introducing the working medium into or discharging the working medium from, the first pressure chamber. The working medium circuit has a working medium pump. The pump is connected to the first pressure port by a pressure line which is connected to a pressure side of the working medium pump. A check valve or shut-off valve which opens in the direction of the first pressure port is provided in the pressure line.

10 Claims, 1 Drawing Sheet

(51) Int. Cl.
    *F15B 11/042*    (2006.01)
    *F01D 17/18*    (2006.01)
    *F15B 13/02*    (2006.01)
    *F15B 13/044*    (2006.01)
    *F16K 31/12*    (2006.01)

(52) U.S. Cl.
    CPC .......... *F15B 13/021* (2013.01); *F15B 13/027* (2013.01); *F15B 13/0444* (2013.01); *F16K 31/12* (2013.01); *F15B 2211/20515* (2013.01); *F15B 2211/20538* (2013.01); *F15B 2211/30505* (2013.01); *F15B 2211/45* (2013.01); *F15B 2211/851* (2013.01)

(56) References Cited

U.S. PATENT DOCUMENTS 5,245,068 A     9/1993    Picard et al.
9,328,842 B2 *   5/2016    Tauber .................. F15B 20/008

FOREIGN PATENT DOCUMENTS

| DE | 19940967 C1 | 12/2000 |
|---|---|---|
| DE | 102009021668 A1 | 11/2010 |
| EP | 0127027 A1 | 12/1984 |
| EP | 0277602 A2 | 8/1988 |
| EP | 0555351 A1 | 8/1993 |
| EP | 0924159 A2 | 6/1999 |
| EP | 2620655 A1 | 7/2013 |
| WO | 2011044870 A1 | 4/2001 |

* cited by examiner

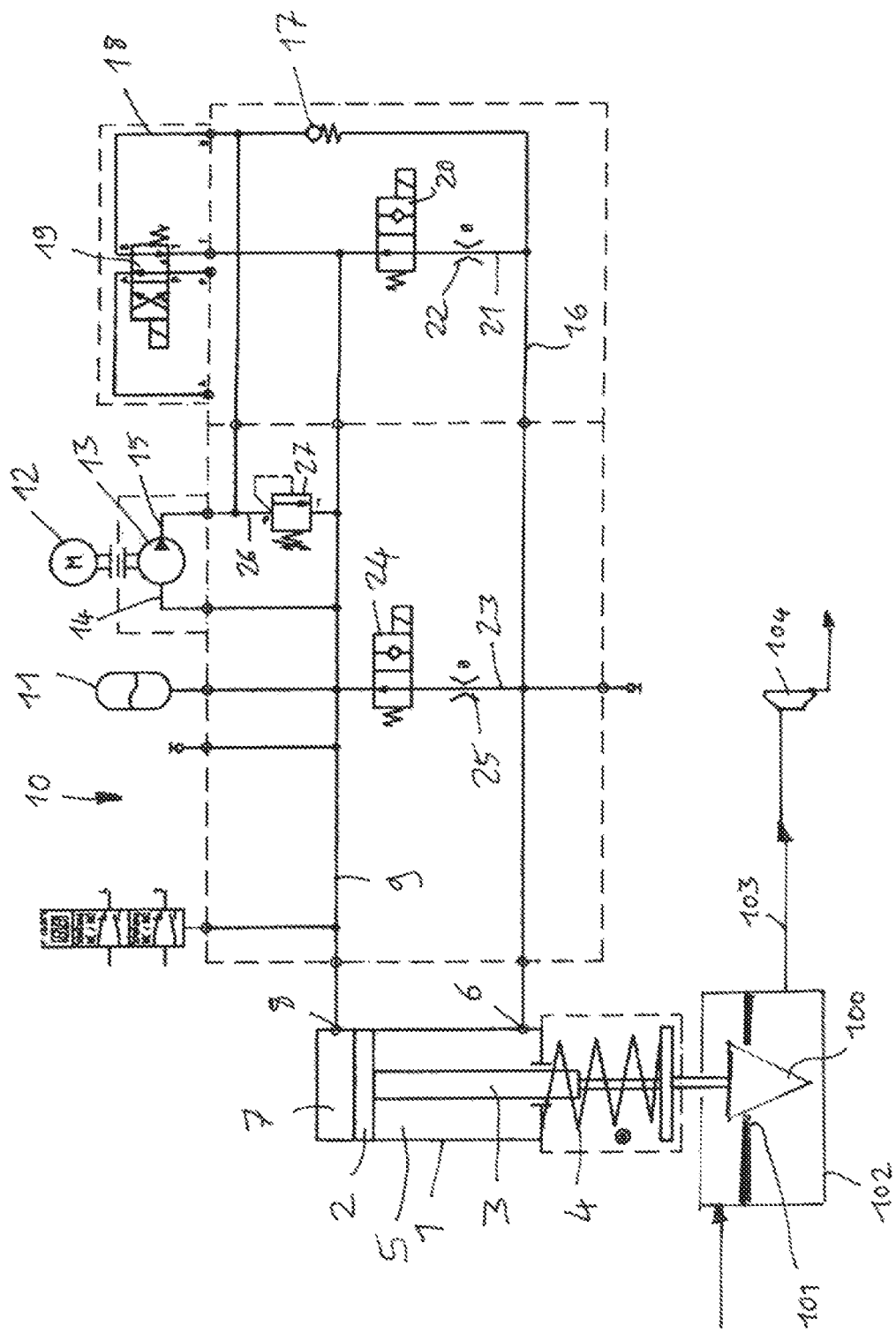

ACTUATING DRIVE FOR A CONTROL VALVE, IN PARTICULAR A STEAM TURBINE CONTROL VALVE, AND METHOD FOR OPERATING SAME

BACKGROUND OF THE INVENTION

Field of the Invention:

The present invention relates to an actuating drive for a regulation valve, in particular for a steam turbine regulation valve, as per the preamble of the main claim and to a method for operating the same.

In steam power plants, the steam generated by means of a steam generator is supplied via at least one, generally two to four, steam turbine regulation valves to the steam turbine, in which said steam is expanded, generating mechanical work, and said steam is subsequently supplied to a condenser for condensation purposes. The steam turbine regulation valves are positioned in parallel steam feed lines of the steam turbine in order that the extremely large steam volume flows can be distributed to the different steam turbine regulation valves. Despite the distribution, the steam volume flows per valve remain so large that the valves generally weigh several tons, and correspondingly, the valve body has a high weight, which must be moved by a correspondingly powerful actuating drive.

For the drive of the regulation valves, use is thus generally predominantly made of hydraulic or possibly also pneumatic actuating drives, which have a working cylinder, with a piston rod connected to a piston, as actuator for the valve body of the respective regulation valve, in order that, by retraction of the piston rod into and deployment of the piston rod out of the working cylinder, the valve body is actuated so as, for example in the steam power plant mentioned, to close the flow cross section of the steam turbine regulation valve to a greater or lesser extent.

For the displacement of the piston with the piston rod in the working cylinder, the piston delimits at least one pressure chamber into which a pressurized working medium, either a hydraulic working medium, for example oil, or a pneumatic working medium, for example air, can be introduced in order to displace the piston counter to the force of a spring. The pressure of the working medium is built up by means of a working medium pump in the external working medium circuit, to which the working cylinder is connected by means of at least one corresponding pressure port of the pressure chamber. Since, as is the case in an embodiment of the present invention, the external working medium circuit is generally designed as a closed circuit, said working medium circuit generally has not only a pressure line, via which the pressurized working medium is introduced from the working medium pump into the first pressure chamber, but also a tank line, which tank line conducts working medium out of a second pressure chamber via a second pressure port of the second pressure chamber, which second pressure chamber is positioned on that side of the piston which is averted from the first pressure chamber and which second pressure chamber is delimited with respect to the first pressure chamber by means of the piston, and which tank line feeds said working medium for example to the suction side of the working medium pump. In this way, a double-acting working cylinder for the retraction and deployment of the piston can be realized.

EP 0 055 351 A1 describes a corresponding electrohydraulic actuating drive, having a double-acting working cylinder connected to an external working medium circuit, wherein, in the external working medium circuit, a working medium pump conveys working medium from a working medium reservoir via a check valve into either a first pressure chamber or a second pressure chamber of the working cylinder in order to deploy the piston rod thereof with action in the same direction as the force of a compression spring or in order to retract the piston rod thereof counter to the force of the compression spring. The degree of opening of a turbine regulation valve is determined by means of the position of the piston or of the piston rod. For the rough positioning of the piston in the working cylinder, a binary throughflow switch in the form of a four-way switching slide valve with three switching positions is provided, the two control lines of which are connected to the pressure chambers on both sides of the piston in the working cylinder, and which is furthermore connected via a pressure line to the pressure side of the pump and by means of a tank line to the working medium reservoir. For the fine positioning of the piston, an electrohydraulic transducer in the form of a pilot-controlled servo valve is provided.

A disadvantage of the actuating drive as per EP 0 055 351 A1 is that the efficiency is limited by the throttling losses at the control edges of the throttling directional valves, which are in the form of continuously adjustable valves. Furthermore, high demands are placed on a constant supply pressure in order that the position of the piston in the working cylinder can be regulated in an exact manner.

DE 40 30 107 A1 describes a corresponding actuating drive in which throttling losses owing to continuously adjustable valves are substantially avoided. In said actuating drive, which likewise has a working cylinder with two pressure chambers which are connected to an external working medium circuit with a working medium pump, the working medium pump, which is designed as a constant-displacement pump and which is driven by means of a rotational-speed-regulated motor, is used to pump working medium via a check valve, which is open in the conveying direction, into a first pressure chamber of the working cylinder, such that the piston with the piston rod retracts counter to the force of a compression spring. A disadvantage is that the deployment of the piston rod is effected exclusively by the force of the compression spring, whereby the dynamic actuation characteristic is asymmetrical and, in the direction of the spring force, is defined only by the hydraulic-mechanical configuration of the flow resistance and cannot be influenced by electrical control signals. Furthermore, the working medium pump must be capable of starting up counter to the pressure prevailing in the pressure chamber of the working cylinder over all rotational speed ranges.

It is also the case in the actuating drive as per EP 2 620 655 A1 that throttling losses in continuously adjustable valves are substantially avoided, and furthermore, a working medium pump driven by a servomotor is provided in the external working medium circuit, which working medium pump is of variable rotational speed and can pump working medium from a first pressure chamber of the working cylinder into a second pressure chamber of the working cylinder and vice versa in order to thereby rapidly adjust the desired position of the piston and thus of the piston rod. Here, however, there is likewise the disadvantage that the working medium pump must be capable of operating counter to the working medium pressure in the two pressure chambers of the working cylinder over all rotational speed ranges, and a relatively expensive synchronous servomotor is required for dynamic and precise control. Furthermore, the working medium pump must be capable, in the static state of the piston, of imparting a holding pressure counter to the spring which exerts pressure on the piston. The torque required for the holding pressure at low rotational speed is a thermally unfavorable operating situation for the motor of the working medium pump. Also, the working medium pump tends to overheat in the case of high pressures and low volume flows, such as are required for the fine positioning of the piston.

SUMMARY OF THE INVENTION

The present invention is based on the object of specifying an actuating drive for a regulation valve, in particular steam turbine regulation valve of the type described in the introduction, and of specifying a method for the operation of an actuating drive of said type, by means of which throttling losses in the external working medium circuit are advantageously avoided, wherein the actuating drive exhibits low production costs and advantageously operates in a manner which avoids thermally unfavorable operating states of the working medium pump and of a motor which drives the latter.

The object according to the invention is achieved by means of an actuating drive and a method for operating the same as per the independent claims. The dependent claims specify advantageous and particularly expedient refinements of the invention.

An actuating drive according to the invention for a regulation valve, in particular steam turbine regulation valve, has a working cylinder with an external working medium circuit connected thereto. The working cylinder comprises a piston with a piston rod connected thereto, which piston rod forms an actuator for the regulation valve. The piston rod can correspondingly be deployed out of and retracted into the working cylinder in order to thereby define the opening cross section of the regulation valve, for example owing to direct or indirect connection of the piston rod to a valve body of the regulation valve, such that the valve body opens a flow cross section of the regulation valve to a greater or lesser extent in a manner dependent on the position of the piston rod.

The piston of the working cylinder delimits at least one first pressure chamber of the working cylinder, and the first pressure chamber has a first pressure port for the introduction of a pressurized working medium into the first pressure chamber for the purposes of displacing the piston with the piston rod, by exertion of pressure, counter to the force of a spring, in particular compression spring, which is assigned to the working cylinder. For example, with increasing pressurization in the first pressure chamber, the piston rod retracts ever further into the working cylinder, and with decreasing pressurization in the first pressure chamber, the piston rod is deployed out of the working cylinder. It is advantageously the case that, with decreasing pressurization in the first pressure chamber, a second pressure chamber provided on that side of the piston which is averted from the first pressure chamber is simultaneously increasingly charged with working medium pressure, as will be discussed in more detail below.

Via the external working medium circuit, which has a working medium pump driven by means of a motor, for example electric motor, pressurized working medium can be pumped into the first pressure chamber. Furthermore, by the external working medium circuit, the working medium can be discharged from the first pressure chamber.

For this purpose, the working medium pump is connected, by means of a pressure line connected to a pressure side of the working medium pump, to the first pressure port of the first pressure chamber, wherein a check valve which opens in the direction of the first pressure port and thus of the first pressure chamber, or a shut-off valve, is provided in the pressure line.

According to the invention, a short-circuit line branches off from the pressure line upstream of the check valve or shut-off valve as viewed in the flow direction of the working medium, in relation to the flow direction of the working medium from the working medium pump into the first pressure chamber, which short-circuit line connects the pressure line to a suction side of the working medium pump while bypassing the working cylinder, wherein there is arranged in the short-circuit line a short-circuit valve by means of which the short-circuit line can be selectively shut off. Here, a shutting-off action refers to any state of the short-circuit valve which prevents a flow of the working medium from the pressure line via the short-circuit line to the suction side of the working medium pump.

On the suction side of the working medium pump there may for example be provided a working medium reservoir, also referred to as a tank, from which the working medium pump pumps working medium and/or which serves for the compensation of volume fluctuations in the external working medium circuit, for example owing to the displacement of the piston in the working cylinder.

In an advantageous refinement of the invention, the short-circuit valve is designed as an unregulated open/closed valve which has only two switching positions, specifically a first switching position, in which it blocks a flow cross section of the short-circuit line, and a second switching position, in which it opens up or opens the flow direction of the short-circuit line. With regard to a blocking action, that which has been stated above with regard to a shutting-off action applies.

The working cylinder particularly advantageously has a second pressure chamber with a second pressure port, wherein the expression "pressure port" is not imperatively to be understood to mean that the second pressure chamber is charged with a positive pressure from the outside.

The piston of the working cylinder separates the first pressure chamber from the second pressure chamber. Advantageously, there is provided in the external working medium circuit a reversing line via which the first pressure port of the first pressure chamber is connected in working-medium-conducting fashion to the second pressure port of the second pressure chamber, wherein there is provided in the reversing line a reversing valve by means of which the reversing line can be selectively shut off. It is thus possible for pressurized working medium to be conducted out of the first pressure chamber via the reversing line into the second pressure chamber in order to displace, for example deploy, the piston with the piston rod so as to decrease the size of the first pressure chamber and increase the size of the second pressure chamber.

The reversing valve is advantageously designed as an unregulated open/closed valve which has only two switching positions, specifically a first switching position, in which it blocks the flow cross section of the reversing line, and a second switching position, in which it opens up or opens the flow cross section of the reversing line. In this case, too, that which has been stated above with regard to a shutting-off action applies analogously.

In a particularly expedient refinement of the invention, it is furthermore the case that a throttle is provided in the reversing line, which throttle has a constant cross section or, in the case of a variably adjustable throttle, delimits a variable flow cross section. It is thus possible for the stroke speed of the piston to be fixed or to be set in a variable manner.

In an advantageous embodiment, in parallel with respect to the reversing line, there is provided in the external working medium circuit a fast-closure line in which a fast-closure valve is arranged. The fast-closure line connects the first pressure port of the first pressure chamber in working-medium-conducting fashion to the second pressure port of the second pressure chamber when the fast-closure valve is open. It is hereby possible, for the purposes of quickly achieving a fail-safe position, for the piston or the piston rod to be moved into the suitable position, for example retracted into the working cylinder by the force of the spring or deployed out of the working cylinder by the force of the spring.

The fast-closure valve is advantageously also designed as an unregulated open/closed valve which has only two switching positions, specifically a first switching position, in which it blocks the flow cross section of the fast-closure line, and a second switching position, in which it opens up or opens the flow cross section of the fast-closure line.

There may be connected to the second pressure port of the second pressure chamber a tank line which is connected in working-medium-conducting fashion to the suction side of the working medium pump, in particular without an interposed valve or throttle device. In the present case, the tank line is referred to as a tank line owing to its connection to the suction side of the working medium pump, which does not imperatively mean that a separate working medium tank or working medium reservoir is provided. It is however advantageously the case that the working medium reservoir is connected to said tank line such that the working medium pump can convey working medium out of the working medium reservoir. Here, it may however also be provided that the working medium reservoir serves exclusively for the compensation of volume fluctuations in the external working medium circuit and does not have to be designed as a working medium reservoir through which flow passes.

The reversing line and/or the fast-closure line advantageously branches off from the pressure line downstream of the check valve or shut-off valve as viewed in the flow direction of the working medium, in turn as viewed in the flow direction of the working medium from the working medium pump to the first pressure port or the first pressure chamber, and opens into the tank line.

In one embodiment, a positive-pressure line with a positive-pressure valve branches off from the pressure line upstream of the check valve or shut-off valve as viewed in the flow direction of the working medium and opens into the tank line. The positive-pressure valve may also be designed as an unregulated open/closed valve, that is to say may have only two switching positions, specifically a first switching position, in which it blocks the flow cross section of the positive-pressure line, and a second switching position, in which it opens up the flow cross section of the positive-pressure line. By means of the positive-pressure line and the positive-pressure valve, it is possible for undesired positive pressures in the pressure line or on the pressure side of the pump to be avoided.

The refinement according to the invention makes it possible for the motor that is used to drive the working medium pump to be designed as an electric asynchronous motor, which does not have to be capable of starting up counter to the working medium pressure in the first pressure chamber. It is rather possible for the working medium pump, which is in particular deactivated when the working valve is in the static state, generally with a deenergized motor, to initially be started up without pressurizing action, without the motor having to accommodate a significant load torque, if the piston of the working valve with the piston rod can now be displaced.

A method according to the invention for operating an actuating drive therefore provides that, for the displacement of the piston with the piston rod for the purposes of actuating the regulation valve, it is firstly the case that, with the short-circuit valve open and check valve or shut-off valve closed, the working medium pump is started up to rated rotational speed by means of the motor without pressurizing action, and only subsequently, the short-circuit valve is closed and working medium is pumped by means of the working medium pump via the open check valve, which then automatically opens owing to the pressure build-up after closure of the short-circuit valve, or the shut-off valve, which can in particular be opened in actively actuated fashion, into the first pressure chamber in order to displace the piston rod, for example retract it into the working cylinder, counter to the force of the spring.

The invention offers the advantage that an electric asynchronous motor is much cheaper than a servomotor, which can start up under the action of a load torque. Furthermore, simple (unregulated) switching valves may be used instead of regulation valves, thus avoiding throttling losses. It is also possible for the actuating drive to be controlled with digital signals, that is to say open/closed signals, instead of regulation signals. It is thus possible for the position of the piston in the working cylinder and thus the position of the piston rod to be adjusted for example by means of pulsed switching of the short-circuit valve. When the desired position has been reached, the motor can continue to run with little energy requirement with the short-circuit valve open, because said motor is operating virtually without load, or said motor can be deactivated.

By opening the reversing valve, the spring force of the working cylinder can be utilized to change the position of the piston and thus of the piston rod by virtue of pressure being discharged from the first pressure chamber into the second pressure chamber and/or into the working medium reservoir. If a variable throttle is provided in series with the reversing valve in the reversing line, it is possible, despite the use of an open/closed valve as a reversing valve, for the stroke speed of the working cylinder during the reduction of the volume of the first pressure chamber to be set.

In said situation, it is additionally or alternatively possible for the stroke speed to be set by pulsed actuation of the reversing valve.

Even though a preferred field of use of the actuating drive is for the drive of a steam turbine regulation valve, the actuating drive may also be used for the drive of other regulation valves, for example of gas turbines or else of other assemblies.

BRIEF DESCRIPTION OF THE DRAWING

The invention will be described by way of example below on the basis of an exemplary embodiment and on the basis of the FIGURE.

DESCRIPTION OF THE INVENTION

The single figure of the drawing illustrates an exemplary embodiment of an actuating drive designed according to the invention. The actuating drive regulates, for example, the position of the valve body 100 relative to a valve seat 101 of an in this case only schematically illustrated steam turbine regulation valve 102 in the steam feed line 103 of a steam turbine 104.

The actuating drive has a working cylinder 1 with a piston 2 and with a piston rod 3 connected thereto, wherein the piston rod 3 constitutes the actuator for the steam turbine regulation valve 102.

The piston 2 is preloaded in the direction of a closure of the regulation valve, in this case steam turbine regulation valve 102, by means of a spring 4. In the exemplary embodiment shown, the piston rod 3 is deployed out of the working cylinder 2 in the direction of the spring force, wherein, in another exemplary embodiment, it would also be possible for a retraction of the piston rod 3 to effect a closure of the regulation valve, and it would correspondingly be necessary for the piston to be preloaded in the other direction by the spring force. Usage situations are self-evidently also conceivable in which the spring effects an opening of the regulation valve.

The working cylinder 1 has a first pressure chamber 5 with a first pressure port 6. As a result of introduction of pressurized working medium into the first pressure chamber 5 and an increase in volume of the first pressure chamber 5, the piston rod 3 is retracted into the working cylinder 1 counter to the force of the spring 4 and the valve body 100 is lifted off the valve seat 101, or generally, the regulation valve is opened. Here, a second pressure chamber 7, on that side of the piston 2 which is averted from the first pressure chamber 5, in the working cylinder is reduced in volume, and the working medium from the second pressure chamber 7 is displaced by the second pressure port 8 into the tank line 9 of the external working medium circuit 10. The tank line 9 is for example substantially unpressurized and connected to the working medium reservoir 11, which compensates the difference in volume of the working cylinder 1 between the deployed and retracted positions of the piston rod 3. However, this may also be made of external working medium circuits 10 with a pressurized tank line 9.

In the external working medium circuit 10 there is provided a working medium pump 13 which is driven by means of a motor 12, which working medium pump has a suction side 14 and a pressure side 15. The tank line 9 is connected to the suction side 14, and a pressure line 16 is connected to the pressure side 15.

The pressure line 16 is connected, by means of its end averted from the working medium pump 13, to the first pressure port 6 of the first working chamber 5, such that the working medium pump 13 can pump working medium from the tank line 9 and/or from the working medium reservoir 11 via the pressure line 16 into the first pressure chamber 5.

The working medium pump 13 is for example designed as a constant-displacement pump, which is designed, with regard to its delivery volume, for a single rated rotational speed. The motor 12 is for example designed as an electric asynchronous motor.

In the pressure line 16 there is provided a check valve 17 which opens in the direction of the first pressure port 6 and which blocks in the direction of the working medium pump 13 or in the direction of the pressure side 15 thereof.

Thus, if the working medium pump 13 is deactivated when the first pressure chamber 5 is in the pressurized state, in the case of a closed check valve 17, the working medium is held in the first pressure chamber 5. Instead of the check valve 17, it would be possible for a shut-off valve to be provided which is for example activated from an external source, in particular together with the short-circuit valve 19 described below.

A short-circuit line 18 branches off from the pressure line 16 upstream of the check valve 17, which short-circuit line opens out in the tank line 9 and thus on the suction side 14 of the working medium pump 13. In the short-circuit line 18 there is provided a short-circuit valve 19 which, in the deenergized state, connects the pressure side 15 of the working medium pump 13 to the suction side 14 or the working medium reservoir 11 via the short-circuit line 18, bypassing the working cylinder 1. By contrast, in the activated state, the short-circuit valve 19 prevents a flow of working medium from the pressure side 15 via the short-circuit line 18 to the suction side 14, such that, on the pressure side 15, a pressure builds up in the pressure line 16, which pressure opens the check valve 17 counter to the spring force of the check valve 17.

For as long as the short-circuit line 18 is open for the purposes of connecting the pressure side 15 to the suction side 14, the motor 12 can start up to the rated rotational speed, and bring the working medium pump 13 to its rated rotational speed, without a load torque. After the rated rotational speed has been reached, it is then possible, by actuation of the short-circuit valve 19, for the working medium pump 13 to pump working medium via the check valve 17 into the first pressure chamber 5, and, as illustrated, the piston rod 3 retracts into the working cylinder 1 counter to the force of the spring 4. The desired position of the piston 2 or of the piston rod 3 and thus of the valve body 100 relative to the valve seat 101 can be achieved by means of the time-based control of the actuation of the short-circuit valve 19. The motor 12 can thereafter continue to run with a low energy requirement, or can be deactivated entirely.

By contrast, if it is sought to deploy the piston rod 3, the reversing valve 20 in the reversing line 21 is actuated, which reversing line branches off from the pressure line 16 downstream of the check valve 17 and opens into the tank line 9, and the spring force of the spring 4 can displace the working medium out of the first pressure chamber 5 via the reversing line 21 into the tank line 9 or the working medium reservoir 11. With the adjustable throttle 22 provided in this case in the reversing line 21, the stroke speed of the working cylinder 1 during the deployment of the piston rod 3 can be set, and at the same time, the reversing valve 20 can be designed as an unregulated open/closed valve.

In parallel with respect to the reversing line 21, the fast-closure line 23 also branches off from the pressure line 16 and opens into the tank line 9. By opening the fast-closure valve 24, the steam turbine regulation valve 102 can be quickly placed into the fail-safe position, for which purpose the piston rod 3 is deployed out of the working cylinder 1. In this case, too, the stroke speed can be set by means of a throttle 25 provided in the fast-closure line 23, and the fast-closure valve 24 can be designed as an unregulated open/closed valve.

Finally, the positive-pressure line 26 also branches off from the pressure line 16 upstream of the check valve 17, in which positive-pressure line the positive-pressure valve 27, also referred to as pressure-limiting valve, is arranged. The positive-pressure line 26 likewise opens into the tank line 9. The positive-pressure valve 27 limits the maximum pressure in the pressure line 16.

The invention claimed is:

1. An actuating drive for a regulation valve, comprising:
   a spring;
   a working cylinder having a piston and a piston rod connected to said piston, said piston rod forming an actuator for the regulation valve, said piston delimiting a first pressure chamber of said working cylinder, said first pressure chamber having a first pressure port for an introduction of a pressurized working medium for displacing said piston with said piston rod, by exertion of pressure, counter to a force of said spring assigned to said working cylinder;

an external working medium circuit connected to said working cylinder for selectively introducing the pressurized working medium into or discharging the pressurized working medium from, said first pressure chamber, said external working medium circuit having a pressure line, a valve, a motor and a working medium pump driven by means of said motor, said working medium pump being connected to said first pressure port of said first pressure chamber by means of said pressure line being connected to a pressure side of said working medium pump, wherein said valve being a check valve or a shut-off valve opening in a direction of said first pressure port and disposed in said pressure line;

a short-circuit line branching off from said pressure line upstream of said check valve or said shut-off valve as viewed in a flow direction of the pressurized working medium, said short-circuit line connecting said pressure line to a suction side of said working medium pump while bypassing said working cylinder; and a short-circuit valve disposed in said short-circuit line and by means of said short-circuit valve, said the short-circuit line can be selectively shut off for prevention of a throughflow of the pressurized working medium to said suction side;

said short-circuit valve being an unregulated open/closed valve which has only two switching positions including: a first switching position, in which said short-circuit valve blocks a flow cross section of said short-circuit line for prevention of a throughflow of the pressurized working medium to said suction side, and a second switching position, in which said short-circuit valve opens up the flow cross section of said short-circuit line; and said second switching position being a de-energized state of said short-circuit valve, and said first switching position being an activated state of the short-circuit valve.

2. The actuating drive according to claim 1, wherein:
said working cylinder has a second pressure chamber with a second pressure port, said piston separates said first pressure chamber from said second pressure chamber; and said external working medium circuit has a reversing line via which said first pressure port is connected in a working-medium-conducting fashion to said second pressure port and a reversing valve by means of which said reversing line can be selectively shut off.

3. The actuating drive according to claim 2, wherein said reversing valve is an unregulated open/closed valve which has only two switching positions, namely a first switching position, in which said reversing valve blocks a flow cross section of said reversing line, and a second switching position, in which said reversing valve opens up the flow cross section of said reversing line.

4. The actuating drive according to claim 2, wherein said external working medium circuit has a throttle disposed in said reversing line.

5. The actuating drive according to claim 2, wherein said external working medium circuit has a fast-closure line with a fast-closure valve disposed in parallel with respect to said reversing line, via said fast-closure line said first pressure port is connectable in a working-medium-conducting fashion to said second pressure port, said fast-closure valve is an unregulated open/closed valve which has only two switching positions, namely a first switching position, in which said fast-closure valve blocks a flow cross section of said fast-closure line, and a second switching position, in which said fast-closure valve opens up the flow cross section of said fast-closure line.

6. The actuating drive according to claim 2, wherein:
said external working medium circuit has a tank line connected to said second pressure port, said tank line connected in a working-medium-conducting fashion to said suction side of said working medium pump, without an interposed valve or throttle device; and said reversing line branches off from said pressure line downstream of said check valve or said shut-off valve as viewed in the flow direction of the working medium and opens into said tank line.

7. The actuating drive according to claim 6, wherein said external working medium circuit has a positive-pressure line with a positive-pressure valve branching off from said pressure line upstream of said check valve or said shut-off valve as viewed in the flow direction of the pressurized working medium and opens into said tank line, said positive-pressure valve is an unregulated open/closed valve which has only two switching positions, namely a first switching position, in which said positive-pressure valve blocks a flow cross section of said positive-pressure line, and a second switching position, in which said positive-pressure valve opens up the flow cross section of said positive-pressure line.

8. The actuating drive according to claim 1, wherein said motor is an electric asynchronous motor.

9. The actuating drive according to claim 2, wherein said external working medium circuit has a variably adjustable throttle disposed in said reversing line.

10. A method for operating an actuating drive for a regulation valve, the actuating drive containing a spring and a working cylinder having a piston and a piston rod connected to the piston, the piston rod forming an actuator for the regulation valve, the piston delimiting a first pressure chamber of the working cylinder, and the first pressure chamber having a first pressure port for an introduction of a pressurized working medium for displacing the piston with the piston rod, by exertion of pressure, counter to a force of the spring assigned to the working cylinder, the actuating drive further having an external working medium circuit connected to the working cylinder for selectively introducing the pressurized working medium into or discharging the pressurized working medium from, the first pressure chamber, the external working medium circuit having a pressure line, a valve, a motor and a working medium pump driven by means of the motor, said working medium pump being connected to the first pressure port of the first pressure chamber by means of the pressure line being connected to a pressure side of the working medium pump, wherein the valve being a check valve or a shut-off valve opening in a direction of the first pressure port and disposed in the pressure line, a short-circuit line branching off from the pressure line upstream of the check valve or the shut-off valve as viewed in a flow direction of the pressurized working medium, the short-circuit line connecting the pressure line to a suction side of the working medium pump while bypassing the working cylinder, and a short-circuit valve is disposed in the short-circuit line and by means of the short-circuit valve, the short-circuit line can be selectively shut off for prevention of a throughflow of the pressurized working medium to the suction side, which method comprises the steps of:

displacing the piston with the piston rod for actuating the regulation valve, by placing the short-circuit valve in a deenergized state to open the short-circuit valve and closing the check valve or the shut-off valve, the working medium pump being started up to rated rotational speed by means of the motor without pressurizing action;

subsequently, placing the short-circuit valve in an activated state to close the short-circuit valve for preventing a throughflow of the pressurized working medium to the suction side; and pumping the pressurized working medium by means of the working medium pump via the open check valve or the open shut-off valve into the first pressure chamber in order to displace the piston rod counter to the force of the spring.

\* \* \* \* \*